United States Patent
Schumacher

(10) Patent No.: US 6,432,372 B2
(45) Date of Patent: Aug. 13, 2002

(54) METHOD AND APPARATUS FOR PREVENTING REACTIVE VAPOR BACKSTREAMING AND BACKSTREAMING INDUCED DEPOSITION

(76) Inventor: John C. Schumacher, 2134 Sorrento Dr., Oceanside, CA (US) 92005

( * ) Notice: Subject to any disclaimer, the term of this patent is extended or adjusted under 35 U.S.C. 154(b) by 0 days.

(21) Appl. No.: 09/257,621

(22) Filed: Feb. 25, 1999

Related U.S. Application Data

(63) Continuation-in-part of application No. 08/128,798, filed on Sep. 28, 1993, now abandoned.
(60) Provisional application No. 60/076,042, filed on Feb. 26, 1998.

(51) Int. Cl.[7] .............................................. B01D 53/74
(52) U.S. Cl. ...................................... 423/210; 239/424
(58) Field of Search ................................ 423/210, 169; 239/423, 424, 422, 434.5; 585/950

(56) References Cited

U.S. PATENT DOCUMENTS

| | | | |
|---|---|---|---|
| 4,083,932 A | 4/1978 | Muraco et al. | 423/210 |
| 4,144,313 A | 3/1979 | Germerdonk et al. | 423/210 |
| 4,153,004 A * | 5/1979 | Barnert | 118/48 |
| 4,801,437 A | 1/1989 | Konagaya et al. | 423/210 |
| 5,019,364 A | 5/1991 | Kitahara et al. | 423/210 |

FOREIGN PATENT DOCUMENTS

| | | | |
|---|---|---|---|
| JP | 4-310215 | 11/1992 | 423/210 |

OTHER PUBLICATIONS

Application from Serial No. 08/128,798 filed Sep. 28, 1993 entitled "Method and Apparatus for Combining Reactive Gases While Delaying Reaction Between Same.".

* cited by examiner

*Primary Examiner*—Stuart L. Hendrickson
(74) *Attorney, Agent, or Firm*—Knobbe, Martins, Olson & Bear, LLP

(57) ABSTRACT

This invention is directed to a method and apparatus of delaying the reaction between a first reactive gas and a second reactive gas as the first reactive gas flows into the second reactive gas. The method comprises the steps of surrounding the first reactive gas with a non-reactive gas to form an insulated first reactive gas; and flowing the insulated first reactive gas into the second reactive gas. A sweep gas is used to impart momentum to the insulated first reactive gas. The apparatus comprises three coaxial tubular members which are used to introduce the first reaction gas, the non-reactive gas, and the sweep gas. The apparatus may be installed in a semiconductor device fabrication process either just upstream of the house exhaust line or upstream of an ODC or air pollution abatement device.

39 Claims, 4 Drawing Sheets

METHOD AND APPARATUS FOR PREVENTING REACTIVE VAPOR BACKSTREAMING AND BACKSTREAMING INDUCED DEPOSITION

RELATED APPLICATIONS

This application is a continuation-in-part under 35 U.S.C. §120 of abandoned U.S. patent application No. 08/128,798 filed Sep. 28, 1993 and entitled METHOD AND APPARATUS FOR COMBINING REACTIVE GASES WHILE DELAYING REACTION BETWEEN SAME. This application is also a conversion under 35 U.S.C. §119 of U.S. Provisional Patent Application No. 60/076,042 filed Feb. 26, 1998 and entitled METHOD AND APPARATUS FOR COMBINING REACTIVE GASES WHILE DELAYING REACTION BETWEEN SAME. The entire disclosures of these earlier applications are hereby incorporated by reference.

Technical Field

This invention relates to a method and apparatus for combining two reactive gases while delaying the reaction between such gases as one flows into the other. More particularly, this invention relates to a method and apparatus for introducing reactive gases into an exhaust gas stream in such a manner that reactions between reactive species in such gases are not permitted in harmful locations, but are permitted in non-harmful locations.

BACKGROUND OF THE INVENTION

Many semiconductor device fabrication processes are carried out under vacuum conditions in order to reduce contamination of the device surface layers being produced and to improve control of the microstructure and chemical homogeneity of any etched or deposited layers. Various reactive gases and vapors are used in this process with the specific vapor phase species dependent upon the desired result of the particular unit operation. Further, since these are production processes, reaction rates must be as high as practical and equilibrium conditions are not achieved in practice, nor do deposition efficiencies approach 100%. As a result, a mixture of reactive vapor species including starting materials and reaction products can be found in the vacuum pump exhaust coming from such processes.

Typically, such vacuum pump exhaust is fed to a common duct system called "house exhaust" or "reactive gas exhaust," for transport to an air pollution control device and a catastrophic release containment system, prior to being vented to the atmosphere. Gases, vapors and liquid and solid particulate matter of sufficient buoyancy are drawn through this house exhaust system and vented to the atmosphere by a suction fan which typically creates about 2 to about 5 inches water negative pressure. Gas velocities in the house exhaust system are typically from about 10 to about 30 feet per second under these conditions on average.

Since the vapor stream passing through the "house exhaust" duct system contains exhaust from many processes, and thus a mixture of reactive vapor species, reaction of species entering the system at different points can occur. Exhaust system reactions can be eliminated to a certain extent by segregation of reactive species categories to specific exhaust systems such as "corrosive," "volatile organic compound" (VOC), etc., but there is a limit to what can be achieved with this scheme at a practical facilities cost.

Some reaction between species in the house exhaust is therefor unavoidable. The problem then becomes one of controlling the location of the reaction. That is to say minimizing reaction in "harmful" locations, and maximizing the fraction of the reaction taking place in "non-harmful" locations. For example, where species in the "house exhaust" can react with species contained in a particular vacuum pump exhaust being fed to the house exhaust, reaction will take place in the vicinity of the junction of the two streams. Exactly where in the vicinity of the junction of the two streams is the crucial issue. Specifically, "back-streaming" of reactant species from the house exhaust past the junction of the two streams into the vacuum pump exhaust can occur. When such "back-streaming" occurs, it can result in reaction product deposition in the vacuum pump exhaust lines under the right conditions. This is a "harmful" location since such deposition can plug the vacuum pump exhaust lines to the extent that vacuum pumping speed is reduced from nominal or optimal, with the result that process control is adversely affected.

It is thus of great value to eliminate reactive vapor backstreaming as is accomplished by the invention herein described, and to cause the reaction between the reactive gases to occur in a non-harmful location rather than in a harmful location such as the vacuum pump exhaust line where clogging can occur.

SUMMARY OF THE INVENTION

This invention is directed to a method and apparatus for delaying the reaction between a first reactive gas and a second reactive gas as the first reactive gas flows into the second reactive gas. The method comprises the steps of surrounding the first reactive gas with a non-reactive gas to form an insulated first reactive gas and flowing the insulated first reactive gas into said second reactive gas. The method may also comprise the step of sweeping the insulated first reactive gas with a sweep gas to provide it with increased momentum during the flowing step. The apparatus comprises first and second coaxial tubular members, means for flowing a first reactive gas through the first and inner tubular member, means for flowing a non-reactive gas through the annular space between the coaxial tubular members, and a chamber through which a second reactive gas flows. The apparatus may also comprise a third coaxial tube member and means for flowing a sweep gas through the annulus between the second and third tubular members to impart momentum.

DRAWINGS

DETAILED DESCRIPTION

Figure 1:
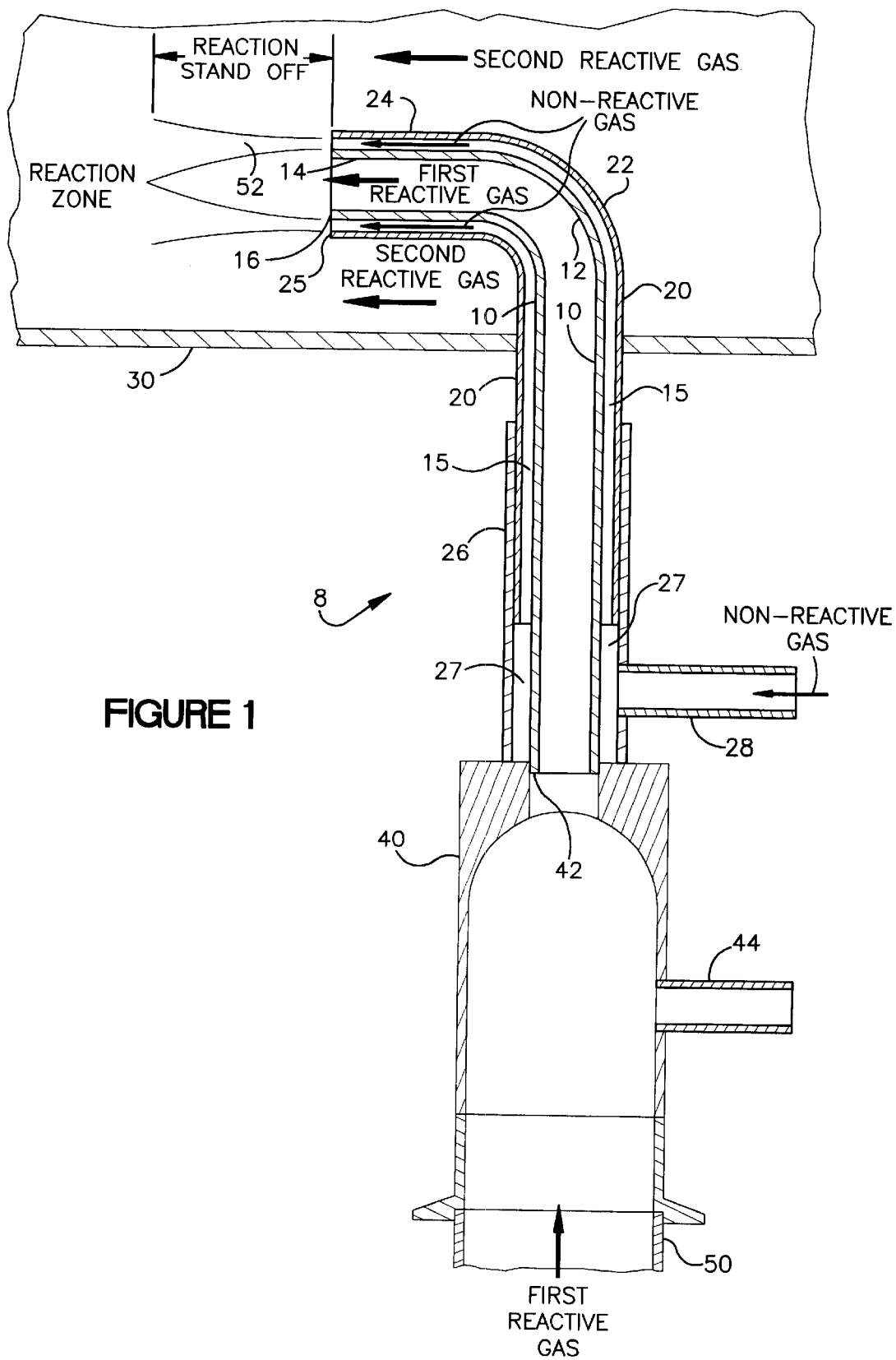
FIG. 1 is a sectioned side elevational view of an apparatus according to the present invention.

Referring to FIG. 1, the apparatus 8 according to the present invention is shown. The apparatus 8 includes a pair of coaxial tubes 10 and 20 which project into exhaust duct 30. Inner coaxial tube 10 is positioned within outer coaxial tube 20. An annulus 15 is formed between coaxial tubes 10 and 20. Coaxial tubes 10 and 20 have right angle bends 12 and 22, respectively, which direct tube sections 14 and 24, respectively, in a direction that is parallel with the center axis of duct 30.

Inner tube 10 is connected to reduction fitting 40 at socket 42. Outer tube 20 is attached to sleeve 26 which is attached to reduction fitting 40. Annular space 27 is formed between sleeve 26 and inner tube 10. Inlet 28 is attached to sleeve 26. Reduction fitting 40 has a port 44 which is attached to a pressure gauge (not shown). Gas inlet line 50 is attached to reduction fitting 40.

In operation, a first reactive gas (e.g., a vacuum pump exhaust from a semiconductor fabrication process) passes through inlet line 50 into and through reduction fitting 40, through inner tube 10 and into duct 30. A non-reactive gas (e.g., nitrogen, argon, etc.) passes through inlet 28 into and through annular space 27, through annular space 15 and into duct 30. In one embodiment the non-reactive gas is advanced to inlet 28 from a pressurized tank or cylinder. A second reactive gas (e.g., a house exhaust from a semiconductor device fabrication process) flows through duct 30. In one embodiment a suction fan, which creates a water negative pressure of about 2 to about 5 inches, is used to effect the flow of the gases through duct 30. The first reactive gas emerges from inner tube 10 into duct 30 and the non-reactive gas emerges from annular space 15 into duct 30, both gases flowing in the same direction as the second reactive gas. As the non-reactive gas and the first reactive gas are advanced into duct 30, the non-reactive gas forms a protective layer 52 around the first reactive gas insulating it from the second reactive gas. This protective layer prevents convective intermixing between the first and second reactive gases. Mixing of the first and second reactive gases does not occur until the first and second reactive gases diffuse through the non-reactive gaseous layer 52. As such, a reaction stand off zone is created between the ends 16 and 25 of coaxial tubes 10 and 20, respectively, and the point downstream from ends 16 and 25 where the first and second reactive gases come into contact. The point downstream where the first and second reactive gases contact each other is the beginning of the reaction zone where the first and second reactive gases react with each other. The reaction stand off zone, as well as upstream locations within tube 10 and annular space 15, are harmful locations wherein reaction between the first and second reaction gases are to be avoided. The reaction zone downstream from the reaction stand off zone is a non-harmful location wherein reaction between the first and second reactive gases are permitted.

The first reactive gas can be any gaseous composition comprising components or species that are reactive with components or species in the second reactive gas. In one embodiment the first reactive gas is a vacuum pump exhaust gas from a semiconductor device fabrication process. The reactive components in this reactive gas composition typically include one or more of $BCl_3$, HBr, $SiBr_4$, $SiHBr_3$, $BBr_3$, $SiH_4$, tetra ethyl ortho silicate, and the like. The reactive components in this gaseous composition are generally present in the composition at concentrations of about 0.1% to about 10% by volume, and in one embodiment from about 0.3% to about 0.6% by volume.

The second reactive gas can be any gaseous composition comprising components that are reactive with components in the first reactive gas. In one embodiment the second reactive gas is a house exhaust gas from a semiconductor device fabrication process. The reactive components of this reactive gas typically include water vapor, oxygen, mixtures thereof, and the like. The water vapor is generally present in this gaseous composition at concentrations of about 10% humidity to about 100% humidity, and in one embodiment from about 30% humidity to about 50% humidity.

The non-reactive gas can be any gaseous composition that is not reactive with the reactive components or species in either the first or the second reactive gases. These include nitrogen, argon, and the like.

In one embodiment, it is critical that the flow of the non-reactive gas through the annular space 15 be laminar or substantially laminar. The Reynolds Number for the flow of this gas through space 15 is generally up to about 3000, and preferably in the range of about 500 to about 3000, more preferably about 1000 to about 2000. In one embodiment the velocity ($V_n$) of the non-reactive gas through annular space 15 is preferably from about 10 to about 60 ft/sec, more preferably about 20 to about 40 ft/sec. The ratio of velocity ($V_n$) of the non-reactive gas through annular space 15 to the velocity ($V_1$) of the first reactive gas through tube 10 (that is, $V_n/V_1$) is preferably from about 1:3 to about 3:1, more preferably about 1:2 to about 2:1. The ratio of velocity ($V_n$) of the non-reactive gas through annular space 15 to the velocity ($V_2$) of the second reactive gas through duct 30 (that is $V_n/V_2$) is preferably from about 1:3 to about 3:1, more preferably about 1:2 to about 2:1.

The temperature and pressure of the first reactive gas in tube 10, the non-reactive gas in annular space 15, and the second reactive gas in duct 30 can vary over a wide range. Typically, each of these pressures range from about minus 10 inches of water to about atmospheric, and in one embodiment from about minus 2 inches of water to about atmospheric. The temperatures can range from about 10° C. to about 100° C., and in one embodiment from about 20° C. to about 30° C.

While not wishing to be bound by theory, it is believed that equilibration of the electrochemical potential between active species in the first reactive gas and the second reactive gas is the driving force for the diffusion of reactive species "upstream," that is to say "countercurrent," to the flow of the first reactive gas in tube 10. Turbulence however is required at the junction of the two streams to provide the mixing and the mechanism for initiation of this mass transport. Turbulent flow at this junction allows convectional mass transport, efficient rapid mixing, and upstream flow into tube 10 via eddy currents at the periphery of flow. Further upstream flow is driven by the tendency to equilibrate the electrochemical potential throughout a system. The invention described herein reduces or denies entry of external reactive species into tube 10, essentially excluding this line from the "system" in which electrochemical potential will be equilibrated over time. Convective intermixing of the active species in the first and second reactive gas streams at the end 16 of tube 10 is prevented by the non-reactive gaseous layer 52. Because of the presence of laminar gaseous layer 52, mixing of the first and second reactive gases must occur via diffusion. Eddy currents backstreaming into tube 10 are eliminated or substantially eliminated, and diffusional intermixing does not occur until some distance downstream of the end 16 of tube 10 (i.e., in the reaction zone) of duct 30. This is a "non-harmful" location. Thus, active species from the second reactive gas do not enter tube 10 and deleterious backstreaming effects are avoided or substantially reduced.

The following examples illustrate the invention. Unless otherwise indicated, in the following examples as well as throughout the entire specification and in the appended claims, all parts and percentages are by weight, all pressures are atmospheric, and all temperatures are in degrees Centigrade.

EXAMPLES 1–7

A first reactive gaseous composition is made by mixing a stream of $N_2$ flowing at a rate of 2 CFM with a stream of $BCl_3$ flowing at a rate of 500 cc/min. This first reactive gas flows through a 1.5 inch O.D. tube with a 0.065 inch wall thickness and then through a reducing area into a 0.5 inch O.D. tube. The velocity of the flow through the 0.5 O.D. tube ranges from 15 to 60 ft/sec as indicated below.

A 0.75 inch O.D. tube with 0.065 inch wall thickness is positioned coaxially around the 0.5 inch O.D. tube. A non-reactive gas stream flows through the annulus between the 0.75 inch O.D. tube and the 0.5 inch O.D. tube. The non-reactive gas is nitrogen. The velocity varies from 11 to 44 ft/sec as indicated below. The flow of this non-reactive gas through the annular space is laminar.

The coaxial 0.5 inch and 0.75 inch tubes have right angle bends and project into a duct. The duct contains a second reactive gaseous composition which consists of humid air having a relative humidity of 30% to 50%. This gas flows at a rate of 15 to 30 ft/sec as indicated below.

The first reactive gas and the non-reactive gas flow from the coaxial tubes into the duct in the same direction as the second reactive gas. This arrangement is illustrated in FIG. 1. As the non-reactive gas and the first reactive gas emerge from the coaxial tubes, the non-reactive gas forms a protective layer around the first reactive gas insulating it from the second reactive gas. This insulating layer prevents convective intermixing between the first and second reactive gases. Mixing of the first and second reactive gases does not occur until these gases diffuse through the non-reactive gaseous layer. This occurs downstream from the point at which the first reactive gas and the non-reactive gas emerge from the coaxial tubes into the duct.

The reaction between the first reactive gas and the second reactive gas is represented by the formula $$2BCl_3 + 3H_2O \rightarrow B_2O_3 + 6HCl$$

The $B_2O_3$ is in the form of a white powder and the distance between the point where the formation of this white powder is observed and the point from where the first reactive gas and the non-reactive gas emerge from the coaxial tubes is measured in inches and recorded as the reaction stand off or the "stand off."

The following results are obtained:

| Example | First Reactive Gas (ft/sec) | Non-Reactive Gas (ft/sec) | Second Reactive Gas (ft/sec) | Stand off (inch) |
| --- | --- | --- | --- | --- |
| 1 | 30 | 22 | 30 | 2 |
| 2 | 15 | 11 | 30 | 1 |
| 3 | 30 | 44 | 30 | 3 |
| 4 | 60 | 44 | 30 | 6 |
| 5 | 30 | 22 | 15 | 1 |
| 6 | 15 | 22 | 30 | 1 |
| 7 | 15 | 44 | 30 | 2 |

Figure 2:
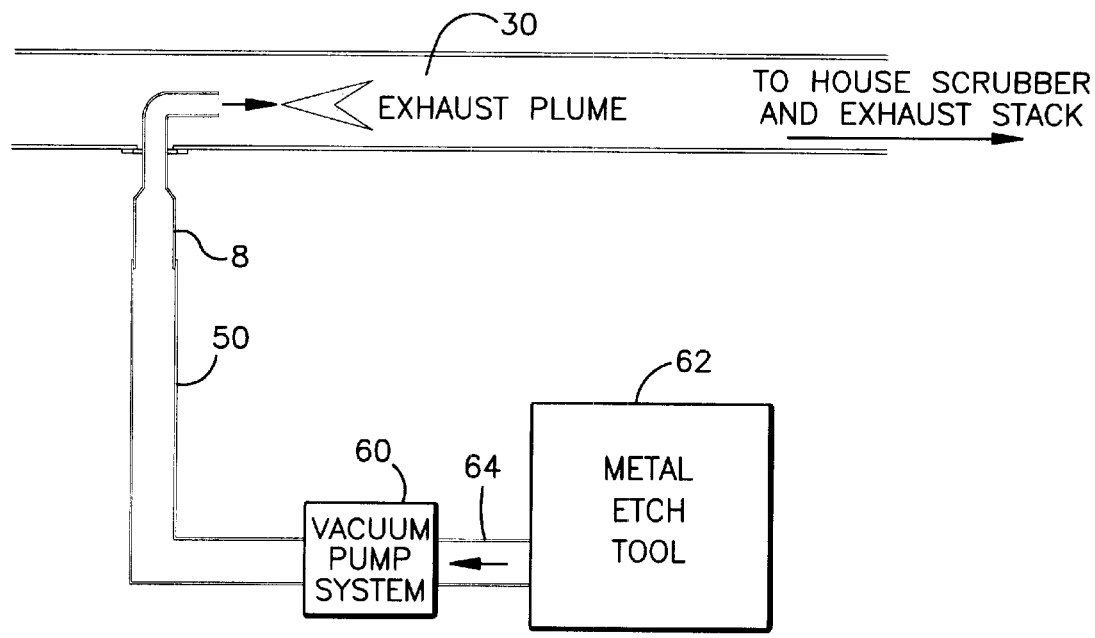
FIG. 2 is a schematic view of a semiconductor device fabrication process into which the apparatus is incorporated according to one embodiment of the invention.

Referring now to FIG. 2, the apparatus 8 is shown incorporated into a semiconductor device fabrication process that is carried out under vacuum conditions. To this end, the fabrication process includes a vacuum pump 60, a metal etch tool (for example) 62 and line 64 therebetween. The gas inlet 50 extends from the pump's outlet to the apparatus 8. The duct 30 is the common duct system for transport to an air pollution control device and a catastrophic release containment system, prior to being vented to the atmosphere. Gases, vapors, liquid and solid particulate matter of sufficient buoyancy are drained through the duct 30 by a suction fan (not shown) which typically creates about 2 to about 5 inches water negative pressure.

Thus, according to one embodiment of the present invention, the method may be practiced just upstream of the house exhaust line. In other words, the apparatus 8 may be installed so that its tubular members 10 and 20 project into the house exhaust duct 30 leading to the house scrubber and exhaust stack.

Figure 3:
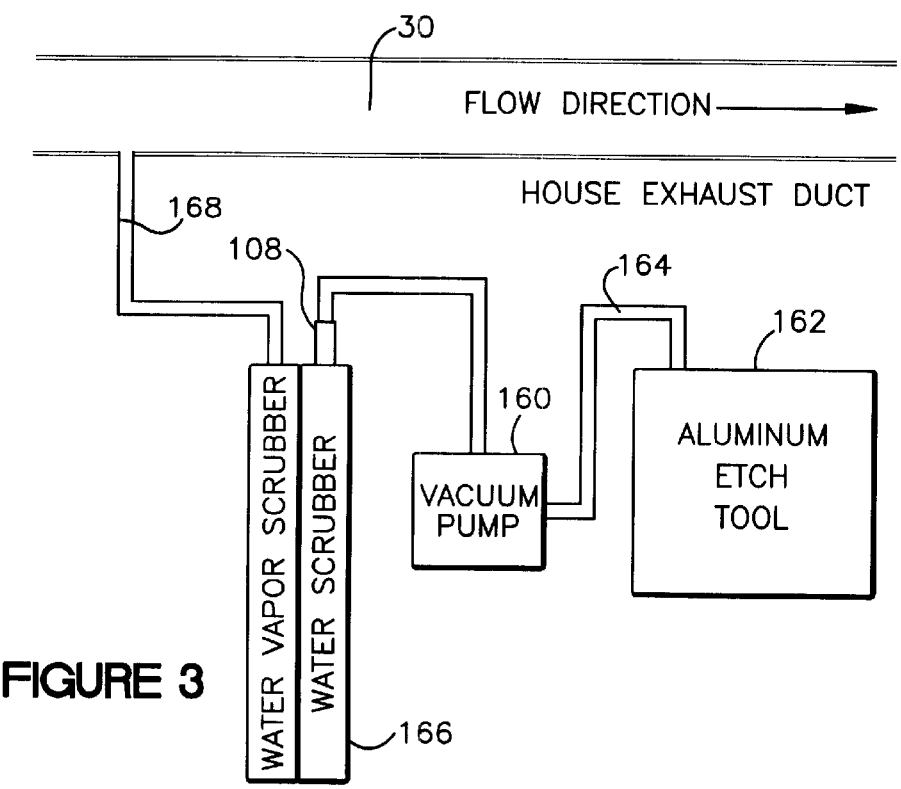
FIG. 3 is a schematic view of another semiconductor device fabrication process into which the apparatus is incorporated according to the present invention.

Referring now to FIG. 3, another semiconductor device fabrication process is shown and it also includes a vacuum pump 160, a metal etch tool (for example) 162 and line 164 therebetween. However, in this process, the first reaction gas contains Ozone Depleting Compounds (ODC), such a $NF_3$, $C_2F_4$ and the like. To abate these emissions, an ODC abatement device 166 such as a scrubber (wet or dry) or a high efficiency thermal oxidation unit is installed downstream of the vacuum pump 160, but upstream of the house exhaust duct 130 and this device 166 may introduce a source of moisture. Specifically, for example, wet scrubbers employ $H_2O$ to remove water soluble materials. For dry scrubbers, the source of moisture can be house exhaust, or leaks into the scrubber. Thermal oxidation units typically entail a combustion reaction that produces $H_2O$. To delay the reaction between the first reaction gas and the moisture in the ODC abatement device 166 (i.e., the second reactive gas), an apparatus 108 is installed upstream of the device 166. Thus, according to a second embodiment of the present invention, the method is practiced, or the apparatus is installed, upstream of an ODC or other air pollution abatement device.

When the apparatus 8 is employed in the house exhaust line 30 according to the first embodiment of the invention, downstream momentum is imparted to the insulated first reaction gas by the second reaction gas flowing in the house exhaust duct 30. When the apparatus 108 is employed upstream of the ODC abatement device 166, the downstream momentum may, in certain situations, be enough to carry the insulated first reaction gas. If so, the apparatus 108 may be substantially the same as the apparatus 8. However, the insulated first reaction gas may experience a velocity loss and temperature drop as it adiabatically expands upon introduction into the abatement device 166. As such, the non-reactive gas may separate from the first reactive gas (i.e., the first reactive gas will become "un-insulated") whereby the moisture-induced reaction may prematurely occur in a harmful location and clog the line leading to the vacuum pump 160.

Figure 4:
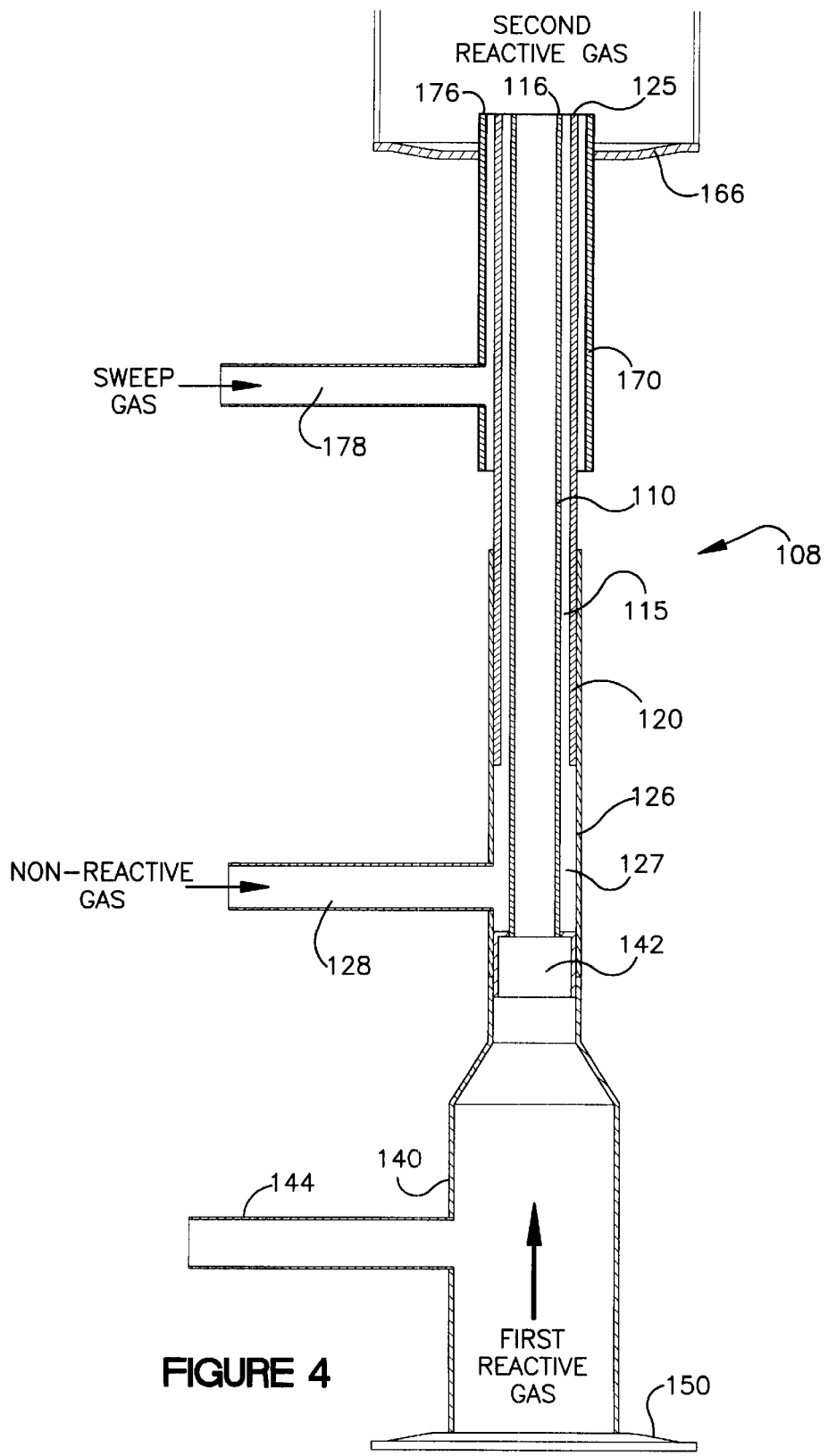
FIG. 4 is a sectioned side elevation view of another apparatus according to the present invention.

Referring now to FIG. 4, the apparatus 108 is shown in detail. The apparatus 108, like the apparatus 8, includes a pair of coaxial tubes 110 and 120 and an annulus 115 formed therebetween. The inner tube 110 is connected to a reduction fitting 140 at a socket 142 and the outer tube 120 is attached to sleeve 26 which is attached to reduction fitting 140 forming an annular space 127 therebetween. The ends 116 and 125 of the tubes 110 and 120 are positioned within the abatement device 166. In operation, the first reactive gas passes through inlet line 150 into and through reduction fitting 140, through inner tube 110 and into the abatement device 166. A non-reactive gas (e.g., nitrogen, argon, etc.) passes through the inlet 128 into and through annular space 127, through annular space 115 and into the abatement device 166.

The apparatus 108 further comprises an outer tube 170 surrounding the tube 120 and forming an annular space 172 therebetween. The end 176 of the outer tube 170 is positioned within the abatement device 166. A "sweep gas" is introduced into the annular space 172 through an inlet 178. The sweep gas provides downstream momentum to the reactants and diffusion barrier constituents, as they move downstream from the injection point into the ODC or other air pollution abatement device 166.

The sweep gas may be reactive or inert, and may flow in either the laminar or turbulent regime, both upstream and downstream of the injection point. The only condition on the sweep gas is that it provides sufficient downstream momentum to reactants and the barrier gas, so that reaction takes place at a point separated from the injection point in the downstream. For example, non-reactive nitrogen, air, etc. may be used. For instance, when the ODC or other air pollution abatement device 166 is a high efficiency thermal oxidation unit, the combustion or destruction efficiency might be compromised by injection of nitrogen which will act as a diluent to the fuel oxidizer mixture. In this case, additional fuel could be employed, or presently supplied fuel could be rerouted, to provide a diffusion barrier and momentum transfer without compromising combustion efficiency.

Figure 5:
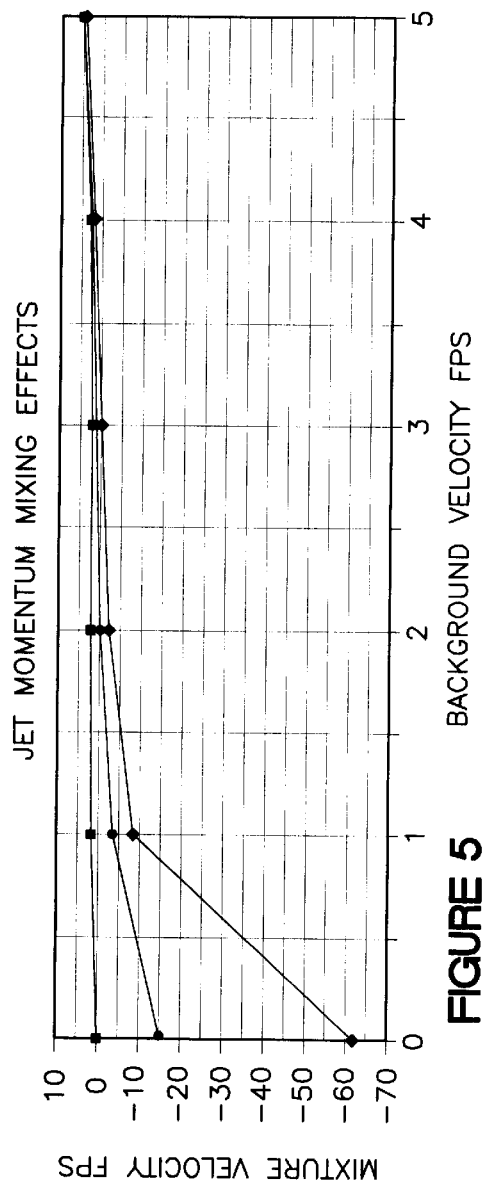
FIG. 5 is a graph of Jet Momentum Mixing Effects.

When the mixture of gases exits the invention being described and enters a tubular wet or dry scrubber entry chamber, conversation of momentum requires that the velocity of the mixture at a downstream point where mixing is complete is given by:

$$V_m = -(\Delta P g_c A - _p V_p - _b V_b - _e V_e)/(_p + _b + _s + _e)$$

wherein:

ΔP=downstream static pressure (injection pressure)
$g_c$=dimensional constant
A=entry port area
=weight rate of flow
V=velocity
p=process
s=sweep
e=entry FIG. 5 represents the relationship of Mixture velocity to Duct velocity as given by the above equation. The triangle points on the graph represent a six inch duct diameter with the "non-sweep" apparatus 8 (i.e., $V_S$=0). The oval points on the graph represent a four inch duct diameter with the "non-sweep" apparatus 8 (i.e., $V_s$=0). The rectangular points on the graph represent a four inch duct diameter with the "sweep" apparatus 108 (i.e., $V_s$=1.5 CFM). A four inch duct diameter is typical of an entry port for a wet or dry scrubber. As shown on the graph, positive velocity is only achieved when the sweep gas is introduced to impart momentum.

With particular reference to the triangular points on the graph, a test was run wherein the outlet of the non-sweep apparatus 8 was fed into a six inch diameter pipe leading to the house exhaust duct. The pipe was made from clear plastic in order to allow viewing of the physics of injection of the reactive gas. The reaction occurred at the injection point and resembled cigarette smoke just drifting around that point. However, when a gate valve was cracked open, the drifting smoke disappeared and a stable cone of gas was established about five to seven inches downstream of the injection point.

Figure 6:
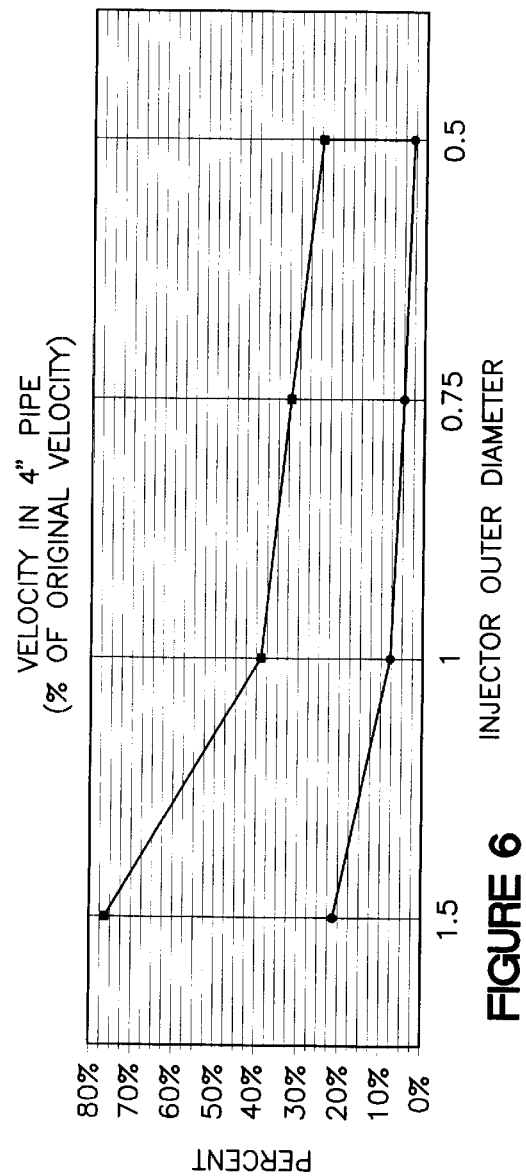
FIG. 6 is a graph of velocity tail-off for different injector diameters.

FIG. 6 is a graph representing further comparison of the velocity "tail-off" on entering a four inch scrubber housing.

The oval points represent the performance of the "non-sweep" apparatus 8 at different injector diameters. The rectangular points represent the performance of the "sweep" apparatus 108 at different injector diameters. As can be seen, the velocity "tail-off" is ten times smaller with the "sweep" design of the apparatus. This difference allows the separation distance from the injection point which is essential to the correct operation of the devices to exist.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of substantially preventing the backstreaming of a first reactive gas into an inlet tube through which a second reactive gas flows into said first reactive gas, comprising the steps of:

flowing said second reactive gas through said inlet tube into said first reactive gas within a passage; and flowing a non-reactive gas through a conduit to substantially surround said second reactive gas as said second reactive gas flows into said first reactive gas, the flow of said non-reactive gas being substantially laminar as characterized by a Reynolds number of 3000 or less, whereby said first reactive gas is substantially prevented from entering said inlet tube to react with said second reactive gas therein and backstreaming induced clogging of said inlet tube is substantially prevented.

2. The method of claim 1, wherein the Reynolds number for the flow of said non-reactive gas in the range from about 500 to 3000.

3. The method of claim 1, wherein the Reynolds number for the flow of said non-reactive gas in the range from about 1000 to about 2000.

4. The method of claim 1, further comprising the step of selecting the flow velocity of said non-reactive gas such that when said non-reactive gas exits said conduit to surround said second reactive gas the flow of said non-reactive gas is substantially laminar.

5. The method of claim 1, wherein said conduit through which said non-reactive gas flows is substantially annular.

6. The method of claim 1, wherein the flow velocity of said non-reactive gas is in the range from about 10 ft/sec to about 60 ft/sec.

7. The method of claim 1, wherein the flow velocity of said non-reactive gas is in the range from about 11 ft/sec to about 44 ft/sec.

8. The method of claim 1, wherein the ratio of the velocity of the non-reactive gas to the velocity of said second reactive gas is in the range from about 1:3 to about 3:1.

9. The method of claim 1, wherein the ratio of the velocity of the non-reactive gas to the velocity of said first reactive gas is in the range from about 1:3 to about 3:1.

10. The method of claim 1, wherein said non-reactive gas comprises nitrogen or argon.

11. A method of substantially preventing the backstreaming of a first reactive gas into an inlet tube through which a second reactive gas flows into said first reactive gas, comprising the step of:

flowing said second reactive gas through said inlet tube into a passage containing said first reactive gas;

flowing a non-reactive gas through a conduit to substantially surround said second reactive gas as said second reactive gas flows into said first reactive gas, and selecting the flow velocity of said non-reactive gas such that when said non-reactive gas exits said conduit to surround said second reactive gas the flow of said non-reactive gas is substantially laminar and is characterized by a Reynolds number of 3000 or less, whereby said first reactive gas therein and backstreaming induced clogging of said inlet tube is substantially prevented.

12. The method of claim 11, wherein the Reynolds number for the flow of said non-reactive gas is in the range from about 500 to 3000.

13. The method of claim 11, wherein the Reynolds number for the flow of said non-reactive gas is in the range from about 1000 to about 2000.

14. The method of claim 11, wherein said conduit is substantially coaxially arranged around said inlet tube.

15. The method of claim 14, wherein said inlet tube has an outer diameter of about 0.5 inches, and said conduit has an outer diameter of about 0.75 inches and a wall thickness of about 0.13 inches.

16. The method of claim 15, wherein the flow velocity of said non-reactive gas is about 23 ft/sec.

17. The method of claim 16, wherein said non-reactive gas comprises nitrogen.

18. The method of claim 17, wherein the Reynolds number for the flow of said non-reactive gas is about 1500.

19. The method of claim 11, wherein the ratio of the velocity of the non-reactive gas to the velocity of said second reactive is in the range from about 1:2 to about 2:1.

20. The method of claim 11, wherein the ratio of the velocity of the non-reactive gas to the velocity of said first reactive gas is in the range from about 1:2 to about 2:1.

21. A method of substantially eliminating clogging of a vacuum pump exhaust from a semiconductor manufacturing device, comprising the steps of:

flowing a first reactive gas through a house exhaust duct;

flowing a second reeactive gas through said vacuum pump exhaust and into said first reactive gas;

flowing a non-reactive gas through a passage and into said first reactive gas, said non-reactive substantially surrounding said second reactive gas as said non-reactive gas and said second reactive gas enter said first reactive gas; and selecting the geometrical dimensions of said passage such that the flow of said non-reactive gas is substantially laminar through said passage and is characterized by a Reynolds number of not more than 3000, whereby backstreaming of said first reactive gas into said vacuum pump exhaust is substantially prevented, thereby substantialy eliminating deposition of solid matter created by reaction between said first reactive gas and said second reactive gas in said vacuum pump exhaust.

22. The method of claim 21, wherein the Reynolds number for the flow of said non-reactive gas is in the range from about 500 to 3000.

23. The method of claim 21, wherein the Reynolds number for the flow of said non-reactive gas is in the range from about 1000 to about 2000.

24. The method of claim 21, further comprising the step of selecting the flow velocity of said non-reactive gas such that the flow of said non-reactive gas is substantially laminar through said passage.

25. The method of claim 21, wherein the flow of said second reactive gas into said first reactive gas is substantially parallel to the flow of said first reactive gas.

26. The method of claim 21, wherein said first reactive gas comprises water vapor, oxygen or a mixture thereof.

27. The method of claim 21, wherein said second reactive gas comprises one or more of $BCl_3$, HBr, $SiBr_4$, $SiHBr_3$, $BBr_3$, $SiH_4$, and tera ethyl ortho silicate.

28. The method of claim 21, wherein said first reactive gas comprises water vapor ($H_2O$), said second reactive gas comprises $BCl_3$ and said solid matter comprises $B_2O_3$.

29. The method of claim 21, wherein said non-reactive gas comprises nitrogen or argon.

30. The method of claim 21, wherein said semiconductor manufacturing device comprises a metal etch tool.

31. A method of substantially preventing backstreaming induced clogging of a tube connected downstream of a first reactive gas and upstream of an exhaust line of a vacuum pump of a semiconductor manufacturing system, comprising the steps of:

flowing a second reactive gas from said exhaust line through said tube and into said first reactive gas within a device;

flowing a non-reactive gas through an annular passage substantially surrounding said tube and into said first reactive gas such that said non-reactive gas substantially surrounds said second reactive gas as said second reactive gas flows into said first reactive gas; and selecting the flow velocity of said non-reactive gas and/or the geometrical dimensions of said annular passage through which said non-reactive gas flows such that the flow of said non-reactive gas in said annular passage and when said non-reactive gas flows into said first reactive gas is maintained substantially in the laminar regime as defined by a Reynolds number of 3000 or less, whereby backstreaming of said first reactive gas into said tube is substantially eliminated, thereby substantially preventing the clogging of said tube and/or said exhaust line.

32. The method of claim 31, wherein the Reynolds number for the flow of said non-reactive gas is in the range from about 500 to 3000.

33. The method of claim 31, wherein the Reynolds number for the flow of said non-reactive gas is in the range from about 1000 to about 2000.

34. The method of claim 31, wherein said non-reactive gas comprises nitrogen or argon.

35. The method of claim 31, wherein said semiconductor manufacturing system comprises a metal etch tool.

36. The method of claim 31, wherein said device comprises a house exhaust duct of a semiconductor manufacturing facility.

37. The method of claim 31, further comprising the step of flowing a sweep gas through an outer annular passage substantially surrounding said annular passage through which said non-reactive gas flows and into said first reactive gas such that said sweep gas substantially surrounds said non-reactive gas as said non-reactive gas flows into said first reactive gas, said sweep gas providing momentum to said non-reactive gas and said second reactive gas.

38. The method of claim 37, wherein said device comprises an ozone depleting compound abatement device.

39. The method of claim 38, wherein said device comprises a wet scrubber, a dry scrubber or a thermal oxidation unit.

* * * * *